June 7, 1932. C. W. ALLEN 1,861,895
METHOD AND APPARATUS FOR THE ARTIFICIAL INCUBATION OF EGGS
Filed March 22, 1928 2 Sheets-Sheet 1

Inventor
C. W. Allen,
By Chas L. Allen
Attorney

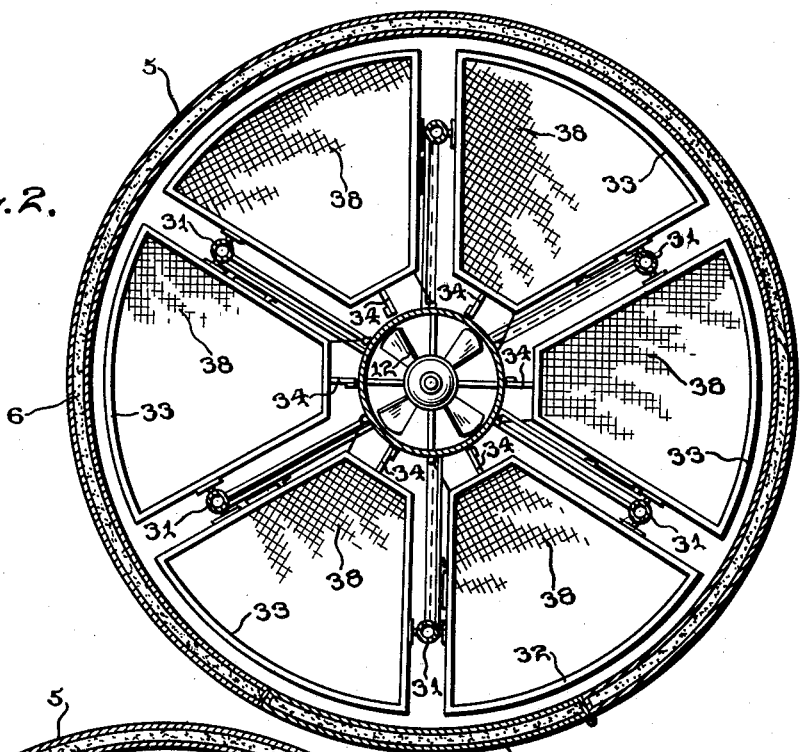
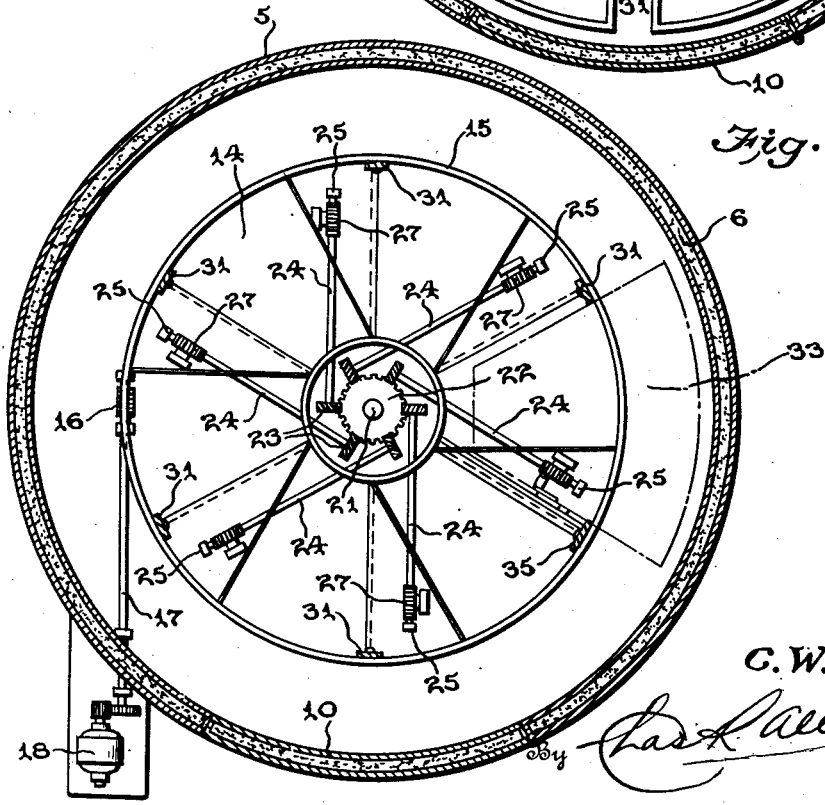

Patented June 7, 1932

1,861,895

UNITED STATES PATENT OFFICE

CLARK W. ALLEN, OF BIG TIMBER, MONTANA

METHOD AND APPARATUS FOR THE ARTIFICIAL INCUBATION OF EGGS

Application filed March 22, 1928. Serial No. 263,744.

My invention relates to incubators, and in particular to a novel method of hatching eggs and an apparatus by which the method is carried out.

In this art it has heretofore been proposed to hatch a plurality of eggs by disposing the same in a series of containers mounted for movement within an incubating chamber, wherein trays or egg containers are rocked in a vertical plane at different stages of the incubation process. This invention has reference to incubation on a large commercial scale and aims to provide for the hatching of a large number of eggs within a minimum space and under novel conditions not heretofore known to the art.

Among the objects which the invention has in view are: the provision of a novel method of hatching eggs; the provision of a novel egg incubation method wherein a plurality of eggs are caused to move in defined paths relative to an air current within an incubating chamber; to provide in such a method a novel manner of agitating air within an incubating chamber by directional movement of eggs disposed therein; to provide a novel apparatus for carrying out the method; and generally to provide novel structural details in an incubator construction.

This description and the accompanying drawings describe and illustrate one practical, physical embodiment of an apparatus by which the novel method is practiced. It is to be understood that the details shown and described do not constitute limitations upon the invention, but that any desired changes in the structural embodiment may be made as will fall within the scope of the invention as claimed. In the drawings:—

Figure 2 is a horizontal section through the incubator adjacent the upper end thereof.

Figure 3 is a horizontal section through the incubator on the line 3—3 of Figure 1.

Figure 1:
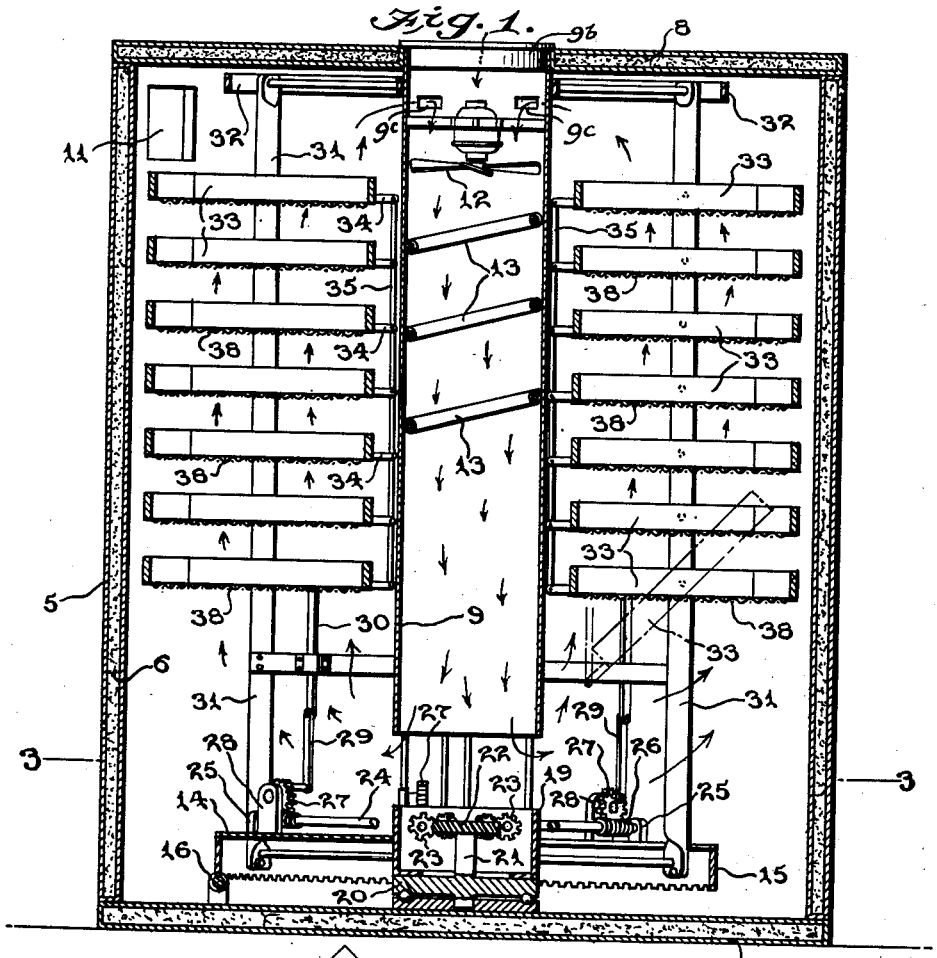
Figure 1 is a central vertical section taken through an incubator constructed in accordance with the principles of the invention.

In detail the incubator consists of an upright circular chamber 5 having spaced inner and outer walls between which is disposed an insulating packing 6 of suitable material, and having a closed bottom 7 and a top 8 provided at its center with a depending air conduit 9 extending downwardly into the chamber and terminating at its lower end in spaced relation above the bottom 7. Access to the interior of the chamber is had through a door 10 provided in a side wall thereof, and air is exhausted from the chamber through a vent aperture 11 disposed in the wall of the chamber adjacent the top, or in the top, as desired.

Air is admitted to the incubator through the adjustable openings 9ª provided in the cap 9ᵇ covering the upper end of the conduit 9 and is drawn downwardly therethrough and through the lateral openings 9ᶜ provided in the conduit 9 by operation of a fan 12 disposed in the conduit, which acts to force the air over a series of heat elements in the form of coils 13 disposed within the conduit below the fan, whereby air is delivered from the open bottom of the conduit in a heated state and is dispersed radially into the chamber.

On the bottom 7 of the incubator chamber and disposed centrally thereon is an annular platform 14 provided with a depending crown gear flange 15 having constant mesh with a worm gear 16 carried on the inner end of a shaft 17 extended through the chamber wall and having its outer end operatively geared to power means comprising, in this instance, an electric motor 18 whereby the platform 14 is rotated. This platform 14 is formed with a vertical hub portion 19 seated on a bottom bearing 20 from which extends a fixed vertical stub shaft 21 provided with a gear 22 on its upper end having constant mesh with a series of radially disposed gears 23 carried at the inner ends of a plurality of tangential shafts 24 journaled in the hub member 19 and in standards 25 carried peripherally by the platform 14. Adjacent their outer ends, these shafts 24 are provided with worm gears 26 having mesh with a series of pinions 27 journaled in vertical brackets 28 and in operative connection with pitmen 29 extending vertically into operative connection with vertically slidable rods 30.

At spaced intervals about the periphery of the platform 14 are secured a plurality of vertical standards 31 having their upper ends secured to a spider 32 having a central bearing against the conduit 9 whereby the platform 14 and the framework comprising the standards 31 and the spider 32 are capable of being rotated as a unit.

Figure 4:
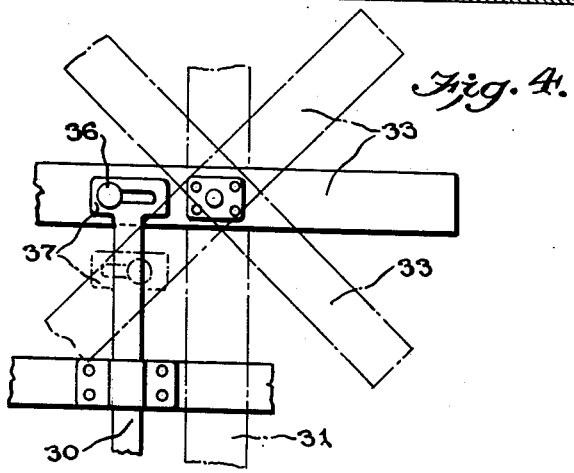
Figure 4 is a detail fragmentary illustration of a portion of the mechanism for imparting movement to the egg trays.
Figure 5:
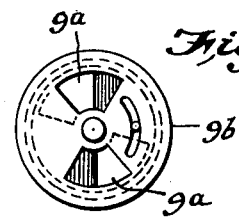
Figure 5 is a detail plan view illustrating a means for admitting fresh air to the incubator.

Journaled between adjacent pairs of the standards 31 are a plurality of segmental egg containers in the form of sector shaped trays 33. These trays 33 are disposed in vertically spaced relation as clearly shown in Figure 1 and are provided at their inner ends with links 34 having common connection in each series to vertical draw bars 35 in pivotal connection with each of the links 34. To the lowermost tray of each of the segmental series there is attached the upper end of one of the vertically slidable rods 30 so that upon operation of the pinions 27 all of the component trays of each series will be rocked in unison and in a vertical plane with a slight jolting of the trays at the end of the rod stroke. Figure 4 illustrates in detail the operating connection between the upper ends of the vertically sliding rods 30 and the side walls of the trays 33, there being lateral pins 36 carried by the side walls of the trays and having sliding engagement in a slot formed in a T-head 37 carried by each of the rods 30. Each of the trays 33 is provided with a screen bottom 38 whereby a free circulation of air may be had upwardly through the eggs disposed in the trays.

The air conduit 9 is formed of a suitable heat distributing material such as metal pipe and functions to provide a central heating unit for the chamber. The egg trays are of such dimensions as to fill substantially the space between the central heating unit and the wall of the chamber when the trays are disposed in horizontal position, as best shown in Figure 2. Sufficient clearance is provided to insure an efficient circulation of air within the chamber.

In the operation of the incubator, the trays 33 are filled with eggs, arranged vertically with small ends down, after which the door 10 is closed and the power means 18 set into operation to cause a continuous rotation of the platform 14 through the mechanism as described. As the platform rotates the superstructure comprising the standards 31 and the radial series of egg trays, will be rotated at a uniform rate of speed slowly about the central heating unit comprising the conduit 9 at a rate of about one revolution in three minutes. The fan 12 is continuously operated to establish a circulation of air through the chamber drawing it from the top above the uppermost egg trays and discharging it from the bottom of the conduit 9 below the lowermost trays from which point it rises through the series of trays to complete the circulation. During the entire period of rotation, the respective series of trays are incessantly rocked in a vertical plane through the mechanism of the pitmen 29 and the rods 30 this movement being very much slower than the rate of revolution. Due to this compound action it will be apparent that each of the trays is caused to travel in a tortuous path throughout the chamber, being rotated about a fixed center, and at the same time being rocked in a vertical plane and in a direction across the line of airflow within the chamber. By this peculiar movement of the series of trays, the eggs themselves are utilized as a means for agitating the air within the chamber causing an effectual dispersion thereof with a consequent uniform distribution of heat to all the eggs within the chamber.

As before stated, the invention resides more particularly in the novel method of hatching eggs rather than in the specific structural means by which the method is carried out. It will be apparent that I have provided a method of hatching eggs by which a plurality of eggs are arranged at various levels in circumferentially spaced series across a defined line of airflow within a closed chamber wherein the eggs are caused to revolve about a fixed heat distributing center and at the same time are rocked to agitate the air within the chamber.

The term agitate as herein employed has reference to the directional change in the constant air flow, which is accomplished through the tilting of the egg trays. With the inner ends of the trays depressed the upward air flow will be directed outwardly from the central heat tube 9, and as these ends are elevated the air flow will be directed inwardly toward the tube 9. There is thus a constant directional change in the air flow so that it passes freely over the tops and bottoms of the trays, alternating inwardly and outwardly relative to the center tube 9.

I claim:

1. The method of hatching eggs by revolving a plurality of eggs through a current of heated air in an incubating chamber, and frequently changing the direction of the air current by frequent movement of the eggs therein in a plane at an angle to the direction of revolution.

2. The method of hatching eggs by causing a plurality of eggs to revolve continuously in one direction in an incubating chamber across a current of air intermittently directed in different directions by movement of the eggs at an angle to the direction of continuous movement.

3. An incubator comprising a chamber, a plurality of egg containers disposed in said chamber in vertically spaced relation, said trays being divided in vertically aligned series, means for causing a flow of heated air in said chamber, means in said chamber for revolving said containers about a fixed center therein, and means actuated by said last named means for rocking all of said containers in a vertical plane during revolution.

4. The method of hatching eggs by continuously revolving a plurality of eggs across a current of heated air in an incubating chamber, with the eggs positioned small end downwards in vertically spaced series, and constantly alternating the direction of air flow along and over the large and small ends of the eggs by movement of the series of eggs.

5. The method of hatching eggs by revolving a plurality of eggs in an incubating chamber about a fixed heat distributing center, said eggs being arranged in circumferentially spaced series, and at the same time causing each series to rock in a plane containing the axis of revolution.

In testimony whereof I affix my signature.

CLARK W. ALLEN.